United States Patent [19]

Schmider

[11] Patent Number: 4,755,699
[45] Date of Patent: Jul. 5, 1988

[54] ENCLOSED MINIATURE MOTOR

[75] Inventor: Fritz Schmider, Hornberg, Fed. Rep. of Germany

[73] Assignee: Papst-Motoren GmbH & Co KG, St. Georgen, Fed. Rep. of Germany

[21] Appl. No.: 653,970

[22] Filed: Sep. 24, 1984

[30] Foreign Application Priority Data

Sep. 22, 1983 [CH] Switzerland .......................... 514883

[51] Int. Cl.$^4$ ........................................... H02K 11/00
[52] U.S. Cl. .................................... 310/68 R; 310/46;
310/156; 310/43; 310/40 MM; 310/46;
310/156; 310/254; 318/254
[58] Field of Search ................. 310/40 MM, 46, 68 R,
310/68 B, 156, 43, 90, 179, 180, 184, 254, 258,
259, DIG. 3, DIG. 6; 318/138, 154, 254 A, 439

[56] References Cited

U.S. PATENT DOCUMENTS

| 3,467,847 | 9/1969 | Faulhaber | 310/266 |
| 3,644,765 | 2/1972 | Janson | 310/254 |
| 3,845,334 | 10/1974 | Harada et al. | 310/156 |
| 4,394,594 | 7/1983 | Schmider | 318/254 |
| 4,468,595 | 8/1984 | Yaebashi | 318/254 |
| 4,532,461 | 7/1985 | Crook | 318/254 |

FOREIGN PATENT DOCUMENTS

| 2020780 | 12/1970 | Fed. Rep. of Germany | 310/DIG. 3 |
| 2000646 | 1/1979 | United Kingdom | 310/68 R |

Primary Examiner—R. Skudy
Attorney, Agent, or Firm—Theodore J. Koss, Jr.

[57] ABSTRACT

Designed especially for hand-held dictation devices the motor has a three-phase external stator and two-pole permanent-magnet internal rotor, the two enclosed by an external housing from one axial end of which the rotor shaft projects out, its other axial end provided with a thrust bearing for the rotor shaft's other end. At least one Hall element, although more typically three, is provided, located at the peripheral edge of one of the axial ends of the rotor to sense axially emanating stray rotor flux. The rotor is directly secured to the rotor shaft, the shaft being ferromagnetic and near its outwardly projecting end provided with a ferromagnetic bearing mounted in a ferromagnetic end plate, so that stray flux sensed by the Hall element can travel from the rotor to the Hall element along a magnetic circuit for such sensed stray flux, but with the magnetic circuit being made up of motor components and structural parts that are required anyway. At least the radially outer part of the stator iron, serving as yoke for conducting motor flux circumferentially along the stator, is constituted by a stack of sheet-metal sheets. The stator iron may be a hollow cylinder at whose inner periphery is provided an annular, cylindrical winding constituted by a continuously wound conductor of uniform conductor-density but provided with angularly spaced taps to form the three phases, or the stator iron may have three radially inwardly extending T-shaped salient poles each carrying a stator-winding coil, with the radially innermost part of the T-shaped salient pole being a pole-shoe plate having circumferentially extending, axially spaced, comb-like slits, with all pole-shoe plates being mounted on a plastic carrier for simultaneous installation of all of them as a single unit. Each phase is energized twice per rotor rotation, with current of a first direction during a respective first half-rotation and then with current of opposite direction during the next half-rotation, to maximize the power-to-weight ratio, this being done using a full-bridge energizing circuit for the three phases.

14 Claims, 5 Drawing Sheets

ENCLOSED MINIATURE MOTOR

CROSS-REFERENCE TO RELATED APPLICATION

The present application is a continuation-in-part of my prior, copending application Ser. No. 632,443 filed July 19, 1984.

BACKGROUND OF THE INVENTION

The invention concerns enclosed miniature motors of the type having an internal rotor and external stator forming a cylindrical air gap, designed as a brushless d.c. motor with the rotor being a permanent-magnet rotor and provided with an axial bearing for the rotor shaft at one axial end face of an external housing for the motor, the rotor shaft projecting out through the external housing's other axial end face, the stator being provided with a winding, and at least the part of the stator which is located radially outwards of the winding to serve as a yoke for conducting flux circumferentially through the stator being formed from a stack of sheet-metal sheets, especially for hand-held dictation devices.

Hitherto there were used in these devices miniature motors with brushes which, on account of extreme, absolutely necessary compactness, exhibit a reduced lifetime resulting from the mechanical commutation. With such devices, strict requirements are placed upon the start-up time, which means that a motor of relatively high power with the lowest possible inertia must be employed.

It is known to employ collectorless direct-current motors where an increased lifetime is used. These motors, especially as the drive in signal-processing devices, were mostly designed as external-rotor motors whose relatively high inertia cannot fulfill the requirement for a start-up time that is as short as possible.

SUMMARY OF THE INVENTION

It is an object of the invention to provide, for very small dictation devices, an axially and radially very compact drive motor which exhibits not only a substantially increased lifetime with sufficiently short start-up time, but which above all makes possible economically advantageous manufacture and which exhibits the small stray field needed in dictation devices.

In accordance with the broadest aspect of the invention this is achieved, preferably in a motor of the type outlined further above, by designing the stator winding as a three-phase stator winding and the permanent-magnet rotor as a one-pole-pair rotor, with at least one rotor-flux-sensing rotor-position sensor being provided in the region of the axially directed stray flux emanating from the rotating permanent-magnet rotor, in order to sense such axial stray flux.

Further details and advantageous variants of the invention are to be had from the exemplary embodiments described below and illustrated in the drawing.

The Figures of the drawing depict:

DESCRIPTION OF THE PREFERRED EMBODIMENTS

Figure 1:
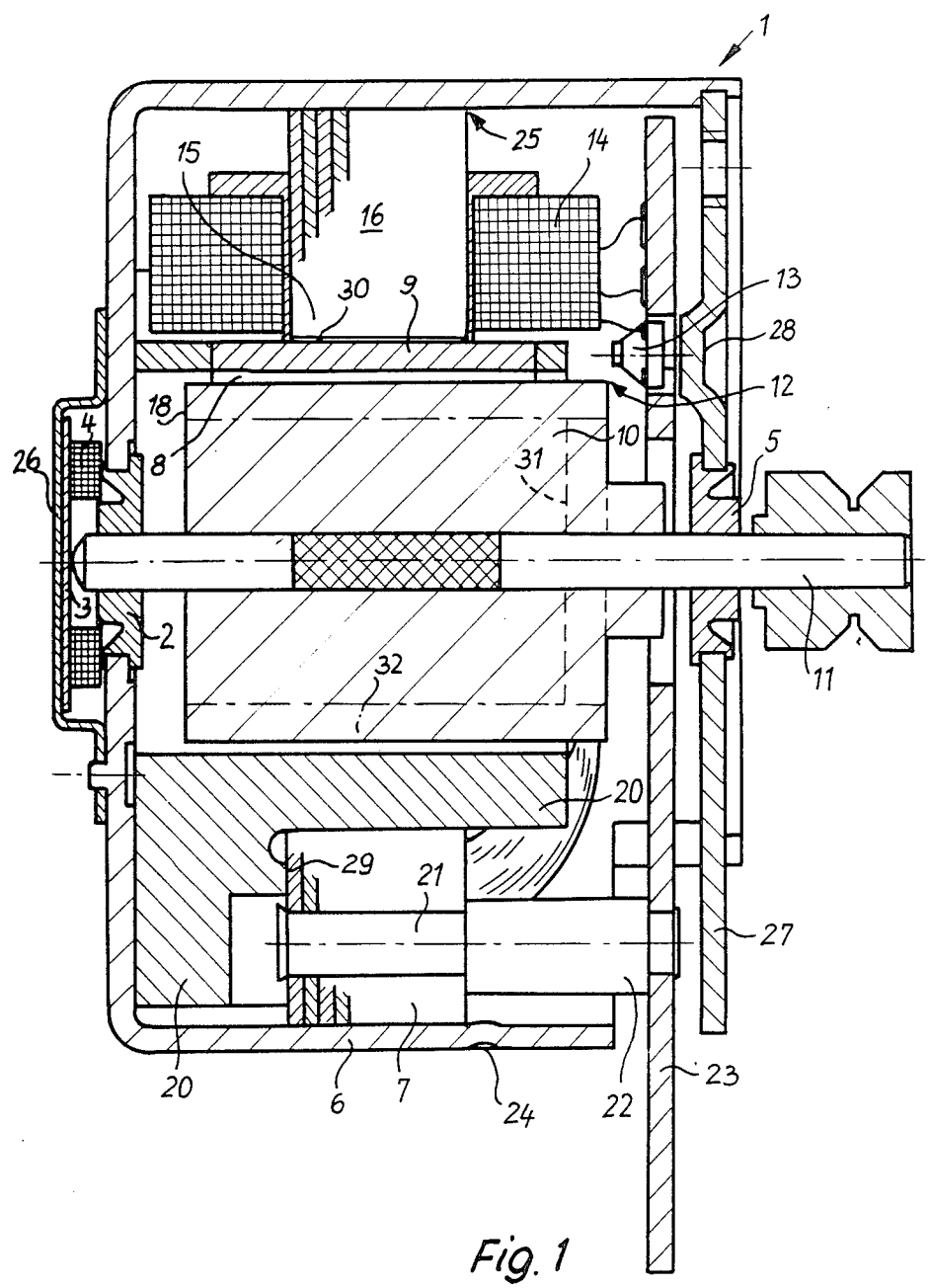
FIG. 1 is a section through an inventive motor in enlarged representation.

Elements which are the same or work the same are hereinafter denoted by the same reference numerals and usually described only once.

In FIG. 1 there is depicted a brushless, internal-rotor, miniature motor 1 which has an externally located stator 7 with three T-shaped salient stator poles 15 oriented radially inwards towards the air gap 8, which is preferably designed cylindrical; radially inward of these salient poles there rotates a two-pole, permanent-magnet, cylindrical rotor 10. The rotor 10 comprises a cylindrical barium-ferrite magnet which is directly secured to a rotor shaft 11. The shaft 11 is journalled in bearings 2, 5 in the axial end walls of housing 6. The rotor 10, principally at one axial end and via its radially outer edge 12, controls three Hall generators 13 which supply commutation signals for controlling the energization of three stator coils 14.

Figure 7:
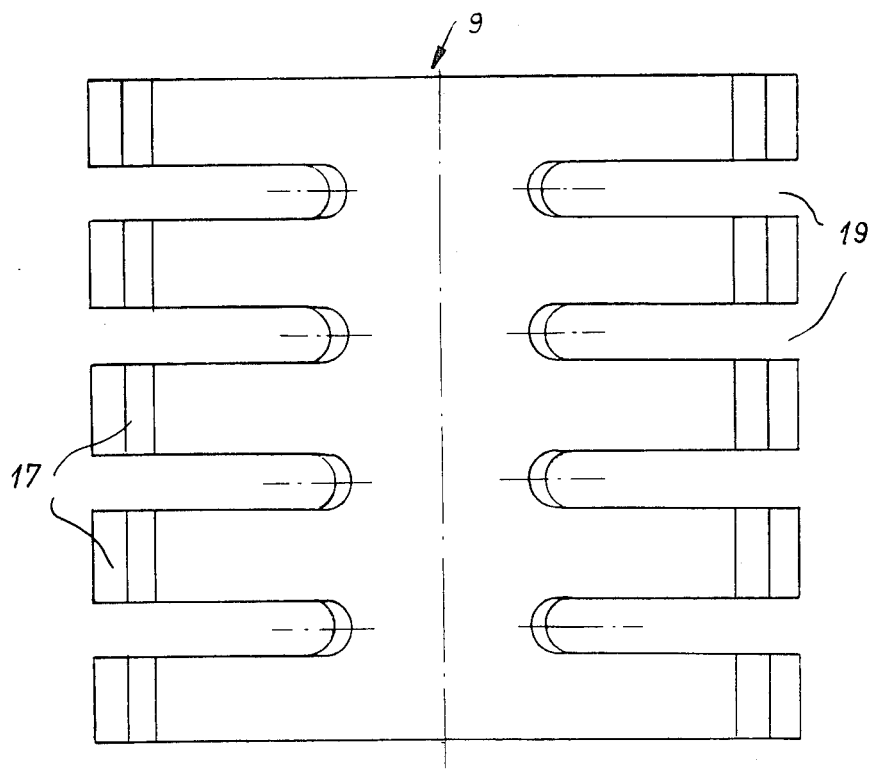
FIG. 7 depicts the pole shoe in front view.

In accordance with a preferred concept, the radially inward, circumferentially extending heads of salient poles 15 can be realized by providing separate pole-shoe plates 9 shown per se in FIG's. 6 and 7 which (as seen in FIG. 1) project axially far beyond the stator's sheet-metal stack 16 and which, proceeding circumferentially, have (as shown in FIG. 7) at both stator-pole ends comb-like slitted end parts 17. As shown in FIG. 1, the internal rotor 10, located opposite the air gap 8, projects with the outer edges of its cylinder axially beyond these magnetic pole plates 9 a certain distance, where its outer edges 12 should reach out axially as near as possible to the Hall generators 13, but also at the oppositely located side at the other axial end 18. The three pole shoe plates 9 are provided, comb-like, with slits 19 which extend parallel to the rotation direction spaced one from the next in the motor's axial direction.

Figure 4:
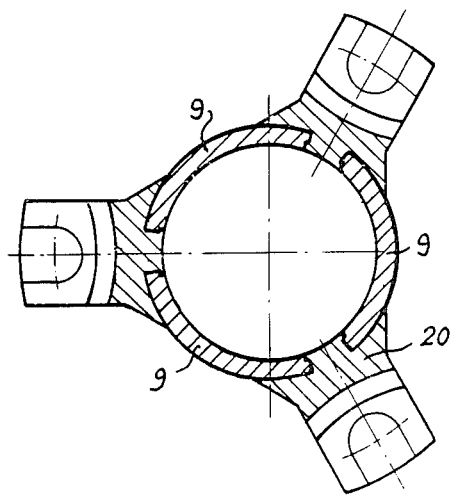
FIG. 4 is a section through a carrier member along the line IV—IV in FIG. 5.
Figure 5:
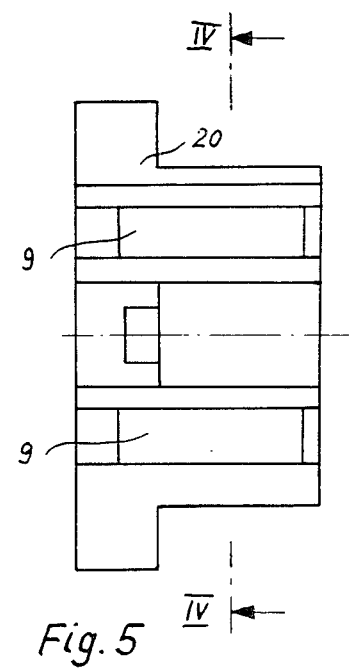
FIG. 5 depicts the carrier member for the pole shoes, in side view.
Figure 6:
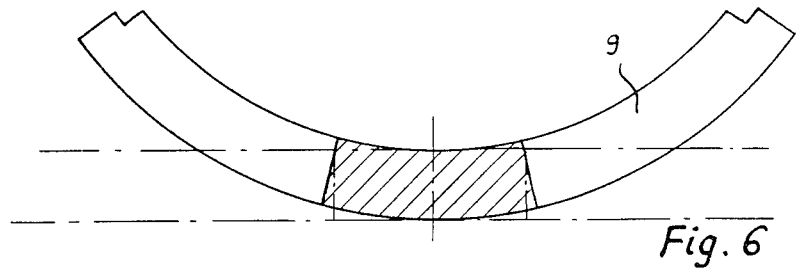
FIG. 6 depicts a pole shoe in plan view.

These three pole plates 9 are according to FIGS. 4 and 5 held via a synthetic plastic carrier member 20. The synthetic plastic of member 20 grips around the three plates 9 in an interlocking manner and forms at the air gap 8 a closed, solid inner peripheral wall which bounds the air gap 8, the pole plates 9 being flush with this wall.

Figure 2:
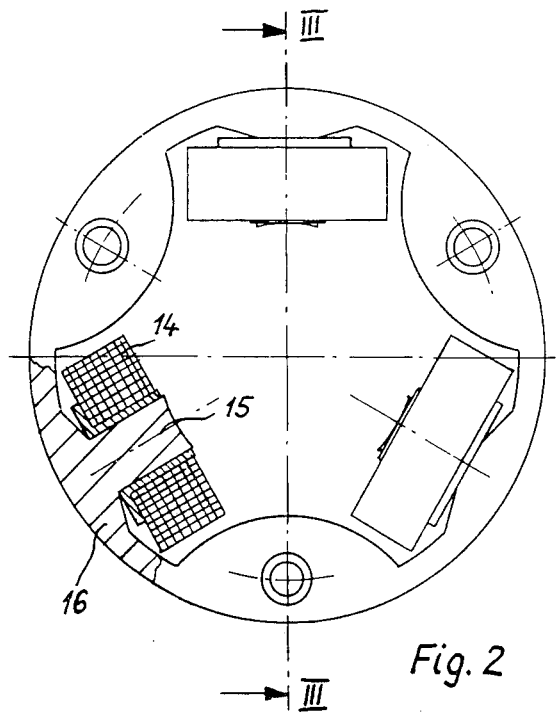
FIG. 2 depicts the stator of the FIG. 1 motor, partially sectioned, seen from below.
Figure 3:
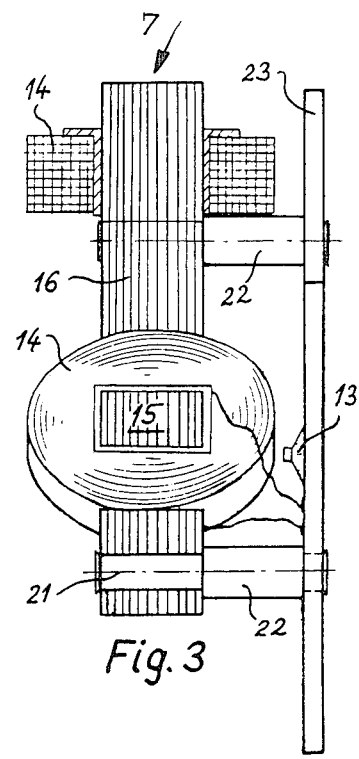
FIG. 3 depicts the stator mounted on a conductor plate, in section along the line III—III in FIG. 2.
Figure 9:
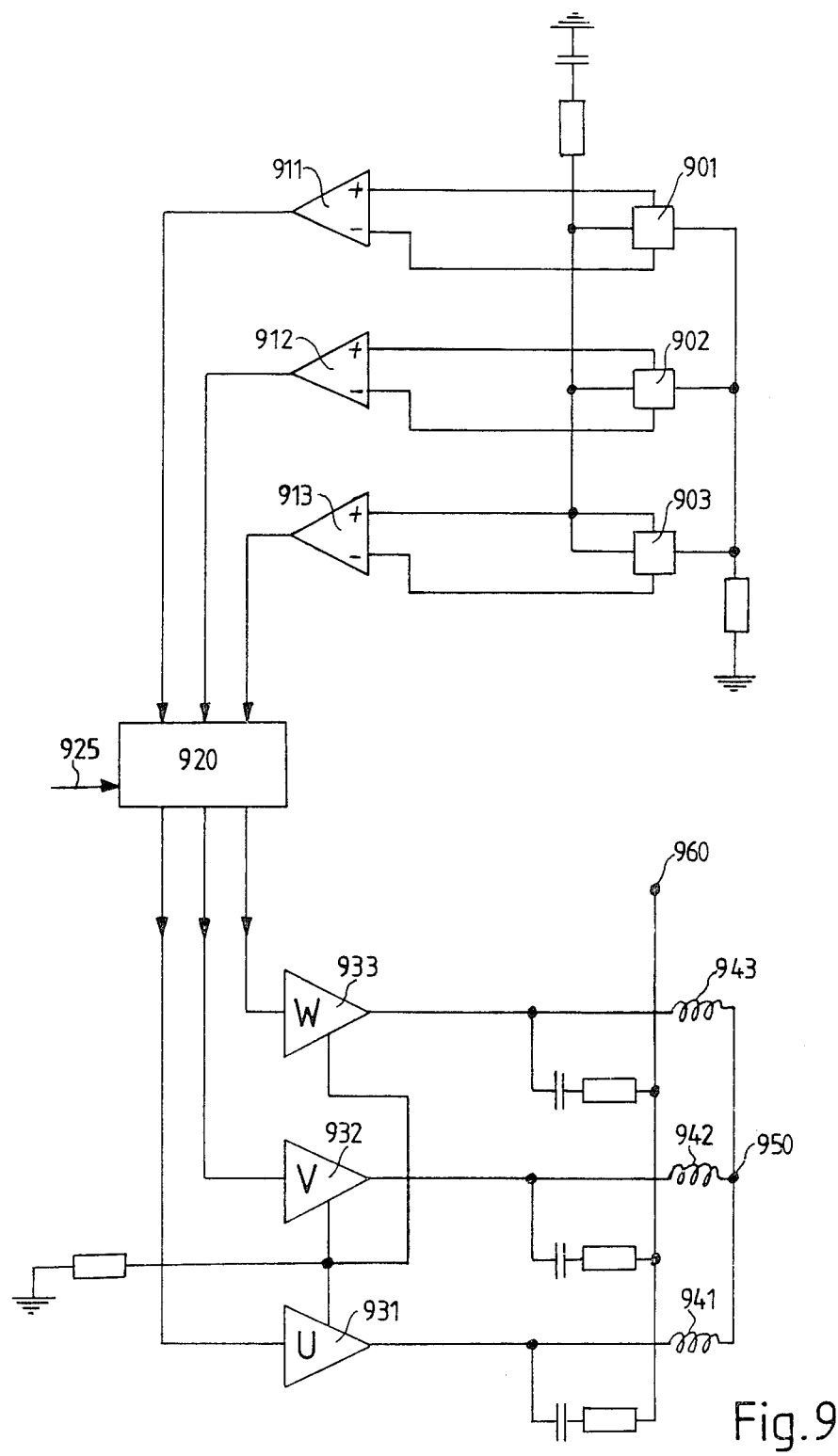

The external housing 6, preferably a cylindrical deep-drawn cup, at its open end accepts the stator 7 with some play. The radially outer surfaces 30 of the pole plates 9, with a slide fit, reach into the region of the inwardly projecting stator pole portions 15 including coils 14 of the stator's stack 16. The synthetic plastic carrier member 20 for the pole plates 9 bears against the end wall of the external housing 6. A planar abutment face 29 of the member 20 bears one end face of the stator's sheet-metal stack 16, which according to FIG. 2 is specially shaped. The latter is in turn secured, according to FIGS. 1 and 3—via three rivet bolts 21, which have a cylindrical extension 22, and via a further rivet bolt to a conductor plate 23—. After insertion of the synthetic plastic carrier member 20 and the stator 7, carrier member 20 and stator 7 are secured by means of a crimp 24 in the external housing 6, the crimp being axially located at that edge 25 of the stator's sheet-metal stack 16 facing toward the open side of the external housing 6. In the base of the external housing 6 a radial bearing 2 is secured, advantageously designed as a sintered-metal low-friction bearing, through which the rotor shaft 11 projects. In a depression provided on the housing's base, or in a a cap-like member 26 placed thereon, a thrust bearing 3 is inwardly arranged, in order to axially bear the rotor shaft 11 and thereby the rotor 10 with the lowest possible friction. Within this cap 26 or depression there is provided a ring-shaped grease reservoir 4 which feeds this thrust bearing 3 and the low friction bearing 2, which in the assembled state is inaccessible. The three stator coils 14 are activated via three Hall generators 13 which, as shown in FIG. 3 for one of the three Hall generators, are mounted on the conductor plate 23. The three stator coils 14 are powered by means of a full-bridge circuit e.g. such as shown in FIG. 9 for the three stator coils numbered 941, 942, 943 because that gives a greater power yield and a greater power-to-weight ratio. (As well known in the brushless d.c. motor art, a full-bridge energizing circuit energizes each phase of the motor's n-phase stator winding twice per 360°-el. of rotor rotation, namely by driving current through each phase in a first direction during the first 180°-el. of rotor rotation, and then driving current through the same phase but in opposite direction during the next-following 180°-el. of rotor rotation. In contrast, a half-bridge energizing circuit, which is in general less costly, drives current through each phase in a first direction during the first 180°-el. of rotor rotation but then, during the next-following 180°-el. of rotor rotation does not energize such phase at all, so that such phase is energized only once per 360°-el. of rotor rotation. For a given weight of the stator, the costlier full-bridge circuit produces torque twice as often, and therefore provides substantially twice the power-to-weight ratio of the half-bridge energizing circuit.) In the circuit shown in FIG. 9, the three Hall generators 13 can not, without more being done, be each replaced by one Hall-IC, because in the wiring on the conductor plate 23 all four terminals of the Hall generator 13 must be fed out, and full-bridge powering with the three terminals that each individual Hall-IC would have, would not be possible. Self-evidently, however, there are equivalent solutions, possibly by means of magnetic diodes or similar elements, or in another fashion, for implementing the full-bridge circuit.

These three Hall generators 13 are built into a magnetic circuit which should exhibit the lowest possible total magnetic resistance.

The stray flux emanating axially from rotor edge 12 travels through such magnetic circuit for each Hall generator 13 as follows: from edge 12 of rotor 10 to Hall element 13; from the latter to a ferromagnetic end plate 27; radially along the end plate 27 to the upper flange-type bearing 5 for the rotor shaft 11, this bearing 5 being made of sintered iron and thus being ferromagnetic likewise; then from bearing 5 along the ferromagnetic rotor shaft 11 back to rotor 10, which latter is directly secured to rotor shaft 11; the flux then travelling radially outwards through rotor 10 back to edge 12 of the rotor. (Of course, if the flux is of polarity opposite to that assumed above, the travel sequence will likewise be opposite.) In this way, the stray flux emanating axially from rotor edge 12 and sensed by Hall sensor 13 can to a certain degree travel to behind the Hall sensor 13 (i.e. can travel via the just-described circuit to a location rightwards of sensor 13 as viewed in FIG. 1). For this purpose the Hall generators 13 should be surrounded by a ferromagnetic holding construction. The relatively large spacing between the conductor plate 23 and the end plate 27 can be drastically reduced by pressing in crimps 28 in this end plate 27 in the region of the Hall generators 13. These crimps 28 can furthermore be used for the positioning or distancing of the conductor plate 23, and thus serve a second purpose.

The smallest possible magnetic resistance in the magnetic circuit of the Hall sensor or signal generator 13 means a good signal which can furthermore be evaluated with few electronics. The soft-magnetic end plate 27 is held by means of a shrink connection to bearing 5 and also effects a shielding against the magnetic stray flux.

A further increase of the power-to-weight ratio can be achieved by designing the permanent-magnet rotor 10 as a magnet tube 32 (shown by dash-dot lines in FIG. 1) and by securing this magnet tube 32 by means of a soft-magnetic disk 31 (broken lines) to the shaft 11. For this design magnetic material made of rare earths is preferably employed.

Figure 8:
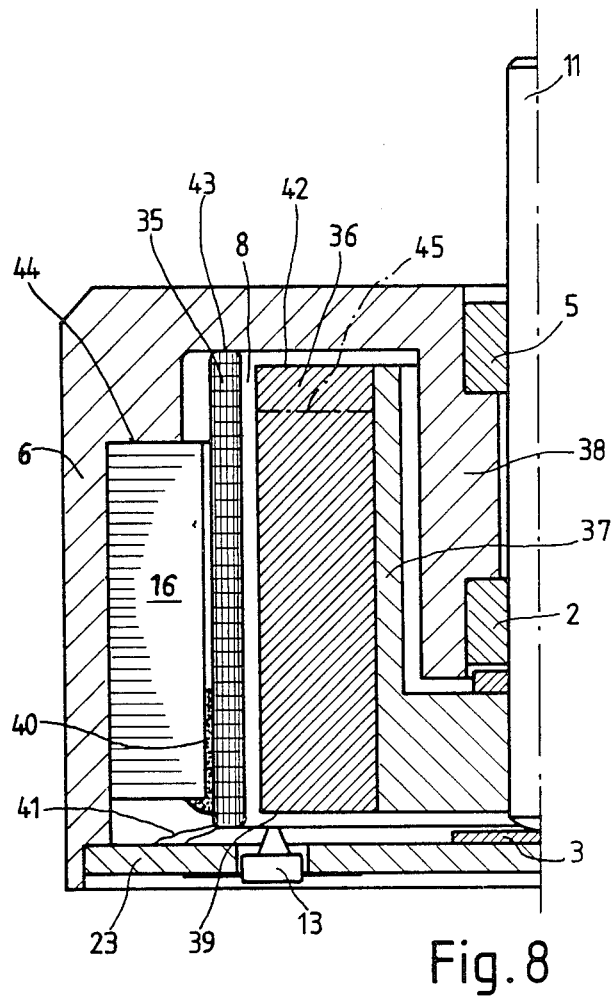
FIG. 8 is a partially sectioned view of a second exemplary embodiment of a motor in accordance with the invention, and FIG. 9 schematically depicts circuit for the commutation of the currents in a motor according to the invention.

FIG. 8 depicts a second exemplary embodiment of a brushless direct-current motor, whose internal rotor comprises a bell-shaped magnet carrier member 37 and, secured to its cylindrical outer surface, a hollow-cylindrical, radially magnetized, permanent-magnet rotor magnet 36 made of a CoSm-alloy. The carrier member 37 consists of soft-magnetic material and is with its base surface connected with the shaft 11 for rotation therewith. For such extremely small motors (so-called micromotors for pocket dictation devices) it is very advantageous to produce the rotor magnet from a rare-earth magnetic material, above all if one requires the motor to produce a certain level of output power despite its great compactness and small absolute size.

The rotor magnet 36 controls at an axial end 39 three equidistantly distributed Hall sensors 13 which supply commutation signals for the control of the current flow in the sections of an annular cylindrical winding 35. This annular cylindrical winding 35 is wound through-going, i.e. continuous with uniform conductor-density and tapped at three locations, each two free wire ends resulting from the tapping being soldered with the conductor plate 23. If a tap is severed and two free wire ends are present, and if at each of the three taps one respective wire of the two is connected to a neutral terminal, and the motor's stator winding becomes as a Y-circuit which is advantageously powered by means of a full-bridge circuit. If the tap is not severed so that only one supply conductor is present per tap, that means a delta-circuit for the motor with half-bridge-circuit powering.

The annular cylindrical winding 35 is located between the stator's sheet-metal stack 16 and the cylindrical external surface of the rotor magnet 36.

The stator's sheet-metal stack 16 is arranged in the external housing 6. This housing furthermore has a bearing-tube-like extension 38 which accommodates the bearings 2, 5 for the shaft 11.

The housing 6 with the axially inwards directed extension 38 is advantageously manufactured from synthetic plastic by injection molding. The carrier member 37 overlaps the bearing-tube-like extension 38.

The stator's sheet-metal stack 16 is with its inner surface connected with the annular cylindrical winding 35, for example by means of a ring of adhesive 40, and with its outer surface is fixedly connected with the housing 6. This connection is achieved by adhesive or else by injection-molding the housing around the stack 16 so as to grip the latter.

The conductor plate 23, which in the exemplary embodiment of FIG. 8 simultaneously has the function of an end plate, contains in addition to the circuit elements, such as e.g. the Hall sensors 13, also the thrust bearing 3 which axially supports the shaft 11. The arrangement of the conductor plate 23 away from the driving end of the shaft 11 prevents stray flux emanating from a driven device from reaching the Hall generator 13.

In FIG. 8 the cobalt-samarium magnet 36 can furthermore be axially shortened to the line 45 without the motor becoming noticeably weaker, inasmuch as in the axial end region of the end face 43 the ironless annular cylindrical winding 35 has scarcely any electromotive action. The motor could, on the other hand, be strengthened if by lengthening the stator plate stack one raises the end face 44 up to at least the axial position of the end face 42 or even past the latter. That would not increase the rotor inertia, and the start-up time could be reduced. If one locates the end face 44 the same as or higher than the end face 42 then, in correspondence to the aforestated, the end face 43 should be located still higher than the end face 44, so that the axial end region of the winding 35 is located, so as to say, in the air. Of course the total axial length of the motor then increases.

The plate 23 is directly designed as a printed board. Parallel to it, outside the motor, a soft-magnetic wall (e.g. sheet-metal plate) would strengthen the signal of the Hall generator. The plate 23 can furthermore be ferromagnetic itself and be provided with openings for accommodating the elements (e.g., 13) and have a printed-circuit overlay for the connecting-on of the elements (e.g., 13).

FIG. 9 depicts a 3-phase full-bridge circuit for powering an inventive motor. Each of the three Hall generators 901, 902, 903 supplies an output signal to one of the three difference amplifiers 911, 912, 913. In so doing the negative signal is inverted and thus the rotor position signal is formed, which is fed to a logic module 920, at which a servo gain input is indicated by an arrow 925. In the logic module 920 the switching signals for the energization of the Y-connected phases 941, 942, 943 of the stator winding are produced after corresponding amplification in the elements 931, 932, 933. The neutral terminal of the Y-connected winding is 950. An additional neutral terminal 960 formed via respective RC-stages makes possible further control possibilities.

I claim:

1. An enclosed, miniature, brushless, cylindrical-airgap d.c. motor, comprising
   a generally cylindrical external housing having two axial ends,
   interiorly of the external housing a stator,
   internally of the stator a permanent-magnet rotor having a total of one north and one south pole,
   a rotor shaft,
   means mounting the rotor coaxially with the rotor shaft for joint rotation of the two, with the rotor shaft projecting outwardly from one axial end of the external housing and furthermore mounting the stator coaxially with the permanent-magnet rotor, said means including an axial bearing mounted at one of said ends of the external housing, the rotor shaft having an axial end which axially bears against said axial bearing,
   a three-phase stator winding mounted to cooperate with the stator, the three-phase stator winding consisting of three phases which comprise a plurality of stator coils provided with feed lines for connecting the three phases to a circuit for energizing the three phases, the stator further comprising radially extending pole portions, which include coil carrying portions and circumferentially extending pole shoe portions,
   the stator, except for the circumferentially extending pole shoe portions, being substantially entirely constituted by a stack of sheet-metal sheets,
   the stator for the circumferentially extending pole shoe portions being in the form of pole-shoe plates provided at the radially inner end of each coil-carrying portion and extending in the axial direction of the rotor shaft in a first axial direction beyond the stator's sheet-metal stack and also extending in the opposite second axial direction beyond the stator's sheet-metal stack, the permanent-magnet rotor having two axial ends, and
   at least one magnetic-field responsive rotor position sensor and means mounting the latter in the region of one of the axial ends of the rotor at a location which is in the region of the axially travelling stray flux emanating from the rotating permanent-magnet rotor,
   each pole-shoe plate being provided with comb-like parallel slits which extend parallel to the rotation direction and are spaced one from the next in the axial direction of the motor.

2. A miniature motor as defined in claim 1, including a circuit for energizing the three phases of the three phase stator winding, the energizing circuit comprising full-bridge energizing circuit means operative for energizing each of three phases twice per rotor rotation by driving current in a first direction through each phase during a respective first half of a rotor rotation but then in the opposite direction during the next-following half of the rotor rotation.

3. A miniature motor as defined claim 1,
   the rotor having a periphery and a peripheral edge at one axial end thereof,
   the means mounting the at least one magnetic-field-responsive rotor position sensor comprising means mounting the latter in the region of the rotor's aforementioned peripheral edge.

4. A miniature motor as defined in claim 1,
   the external housing of the motor having at the one of its two axial ends that is nearer to the at least one rotor position sensor a ferro magnetic housing end wall, the latter being provided at the portion thereof near the at least one rotor position sensor with an axially inwards depression serving to locate the said end wall, at said portion thereof, axially close to the sensor to form, together with the sensor and the rotor, part of a magnetic circuit for the stray rotor flux sensed by the sensor.

5. A miniature motor as defined in claim 1,
   the number of pole shoe plates being three in correspondence to the number of the stator pole shoe portions, said stator including a generally starshaped plastic carrier means which mounts the three pole-shoe plates.

6. A miniature motor as defined in claim 1,
the permanent-magnet rotor comprising a tubular permanent-magnet part provided with said one north and one south pole and furthermore comprising a disk of ferromagnetic material located at the same end face of the rotor at which the sensor is located and directly connecting the tubular part to the rotor shaft.

7. A miniature motor as defined in claim 1,
the rotor comprising a cylindrical permanent magnet secured directly on the rotor shaft,
the external housing of the motor having at each axial end thereof a generally flat end wall,
first and second bearings provided in respective ones of the flat end walls of the external housing mounting the rotor shaft for rotation.

8. A miniature motor as defined in claim 1,
furthermore, comprising a conductor plate and means mounting the conductor plate on the stator of the motor at the other of said axial ends of the external housing, said axial bearing being a thrust bearing directly secured on said conductor plate.

9. A miniature motor as defined in claim 1, the stack of sheet-metal sheets being secured to the interior of the external housing.

10. A miniature motor as defined in claim 4,
the permanent-magnet rotor comprising a tubular permanent-magnet part provided with said one north and one south pole and furthermore comprising a disk of ferro-magnetic material directly connecting the tubular part to the rotor shaft, the disk of ferromagnetic material being located at the same axial end of the rotor at which the sensor is located so as to form, together with said tubular part, said ferromagnetic housing end wall and said sensor, part of said magnetic circuit for the stray rotor flux sensed by the sensor.

11. An enclosed, miniature, brushless, cylindrical-air-gap d.c. motor, comprising
a generally cylindrical external housing having two axial ends,
interiorly of the external housing a stator,
internally of the stator a permanent-magnet rotor having a total of one north and one south pole,
a rotor shaft,
means mounting the rotor coaxially with the rotor shaft for joint rotation of the two, with the rotor shaft projecting outwardly from one axial end of the external housing and furthermore, mounting the stator coaxially with the permanent-magnet rotor, said means including an axial bearing mounted at the other end of the external housing, the rotor shaft having an axial end which axially bears against said axial bearing,
a three-phase stator winding mounted to cooperate with the stator,
the stator being formed by a stack of sheet-metal sheets,
the permanent-magnet rotor having two axial ends,
and at least one magnetic-field-responsive rotor position sensor and means mounting the latter in the region of one of the axial ends of the rotor at a location which is in the region of the axially travelling stray flux emanating from the rotating permanent-magnet rotor,
the stator having a radially inner peripheral surface which is generally cylindrical,
the three-phase stator winding comprising a winding of annular cylindrical shape made up of continuously wound conductor exhibiting a uniform conductor-density and encircling the rotor, said annular cylindrical winding being mounted coaxial with, in proximity to and in electromagnetically cooperating relationship to the generally cylindrical inner peripheral surface of the stator,
the permanent-magnet rotor comprising a tubular permanent-magnet part provided with said one north and one south pole and furthermore comprising a cylindrical carrier member of ferromagnetic material directly connecting said tubular part to the rotor shaft at the axial end of the rotor at which the at least one sensor is located,
the external housing being made of plastic material and comprising a peripheral wall portion, a generally flat end wall portion of one piece with the peripheral wall portion and located at that axial end of the rotor which is opposite to the axial end of the rotor at which the sensor is located, and furthermore, comprising an axially projecting extension which is of one piece with said generally flat end wall portion, said axially projecting extension projecting axially into the interior of the motor,
and furthermore, including two bearings for the rotor shaft, both encircling the rotor shaft and being mounted on said axially projecting extension of said external housing,
the cylindrical carrier member comprising a first tubular portion which is located radially outwards of and encircles said axially projecting extension of said external housing, and
the cylindrical carrier member furthermore, comprising a second tubular portion having an internal peripheral surface secured to the rotor shaft.

12. A miniature motor as defined in claim 11,
furthermore including a circuit for energizing the three phases of the three-phase stator winding,
the energizing circuit comprising full-bridge energizing circuit means operative for energizing each of the three phases twice per rotor rotation by driving current in a first direction through each phase during a respective first half of a rotor rotation but then in the opposite direction during the next-following half of the rotor rotation.

13. A miniature motor as defined in claim 11,
the rotor having a periphery and a peripheral edge at one axial end thereof,
the means mounting the at least one magnetic-field-responsive rotor position sensor comprising means mounting the latter in the region of the rotor's aforementioned peripheral edge.

14. A miniature motor as defined in claim 11,
said stack of sheet-metal sheets having the shape of a hollow cylinder, said radially inner peripheral surface of the stator being the inner peripheral surface of said hollow cylinder, said winding of annular cylindrical shape being secured to the inner peripheral surface of the stack of sheet-metal sheets.

* * * * *